(12) United States Patent
Nagatoshi

(10) Patent No.: US 6,606,203 B2
(45) Date of Patent: Aug. 12, 2003

(54) OCULAR ZOOM LENS

(75) Inventor: Yukiko Nagatoshi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 24 days.

(21) Appl. No.: 10/044,957

(22) Filed: Jan. 15, 2002

(65) Prior Publication Data

US 2002/0191305 A1 Dec. 19, 2002

(30) Foreign Application Priority Data

Feb. 28, 2001 (JP) ........................................ 2001-054787

(51) Int. Cl.[7] .............................................. G02B 15/14
(52) U.S. Cl. ...................... 359/689; 396/379; 359/645; 359/643
(58) Field of Search ................................ 359/689, 643, 359/645, 644; 396/379

(56) References Cited

U.S. PATENT DOCUMENTS 5,663,834 A * 9/1997 Koizumi ..................... 359/643
5,734,509 A   3/1998 Ueno
6,384,984 B1 * 5/2002 Ishii et al. .................. 359/645

FOREIGN PATENT DOCUMENTS

JP    62-134617    6/1987
JP    9-251131     9/1997

* cited by examiner

*Primary Examiner*—Scott J. Sugarman
*Assistant Examiner*—Deborah Raizen
(74) *Attorney, Agent, or Firm*—Arnold International; Bruce Y. Arnold

(57) ABSTRACT

An ocular zoom lens is formed of three lens groups, of positive, positive, and negative refractive power, in order from the eye-point side. The second and third lens groups are moved along the optical axis in opposite directions during zooming, and the second lens group is formed of, in order from the eye-point side, a biconvex lens and a negative meniscus lens with its concave surface on the eye-point side, with the surfaces of the biconvex lens and the negative meniscus lens that face one another having different radii of curvature and being positioned on-axis with an intervening air space. Various conditions are preferably satisfied in order to ensure sufficient eye relief using a relatively small number of lens elements while providing increased freedom of design and enabling favorable correction of aberrations even for wide image angles.

11 Claims, 9 Drawing Sheets

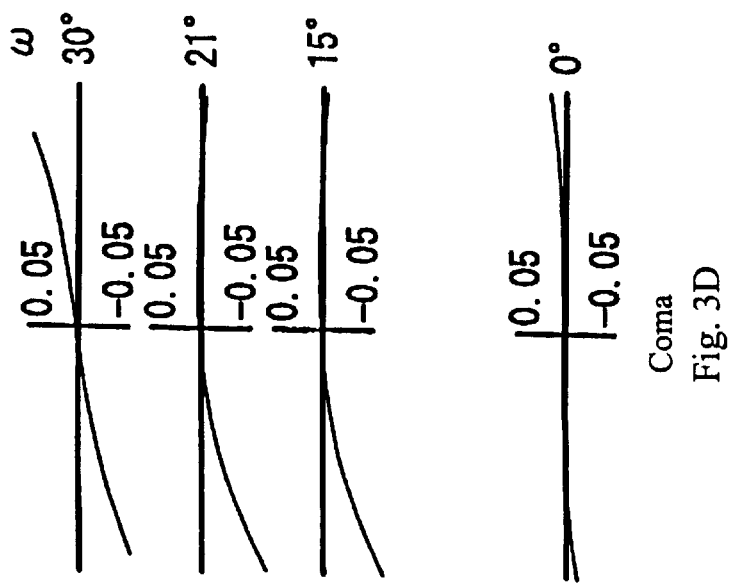
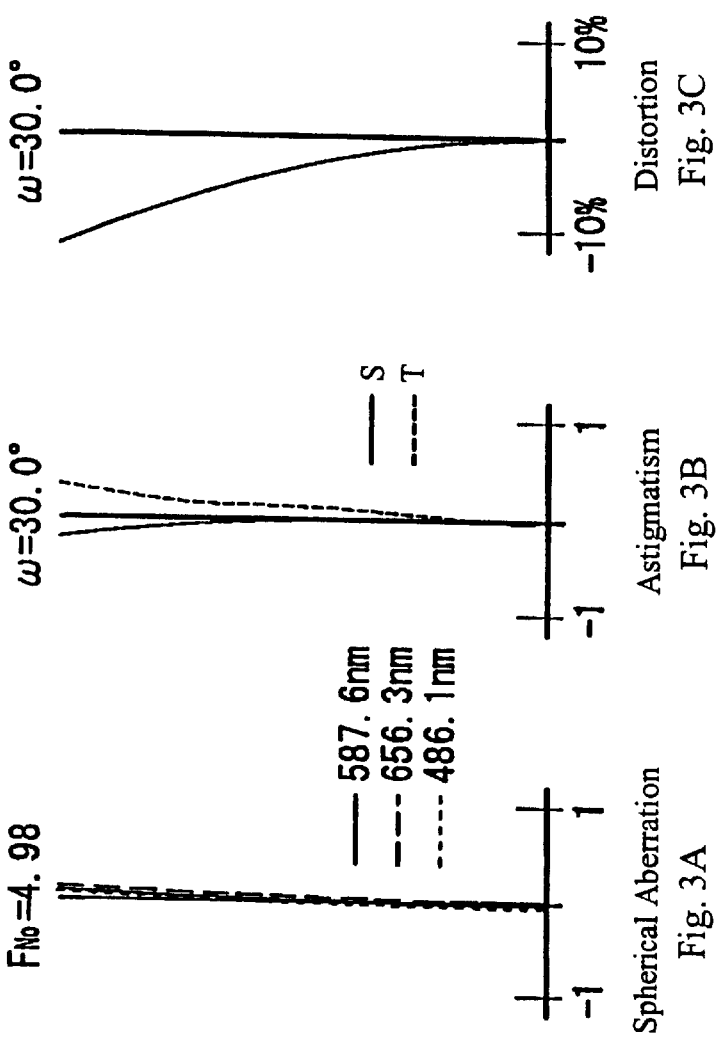

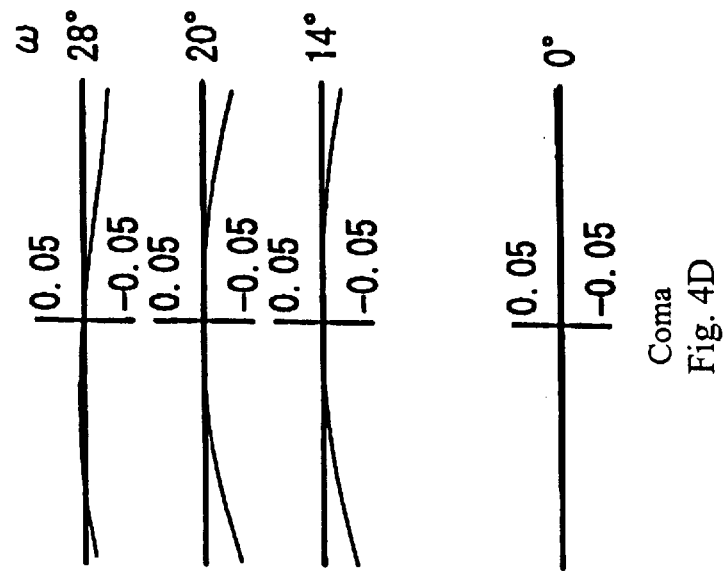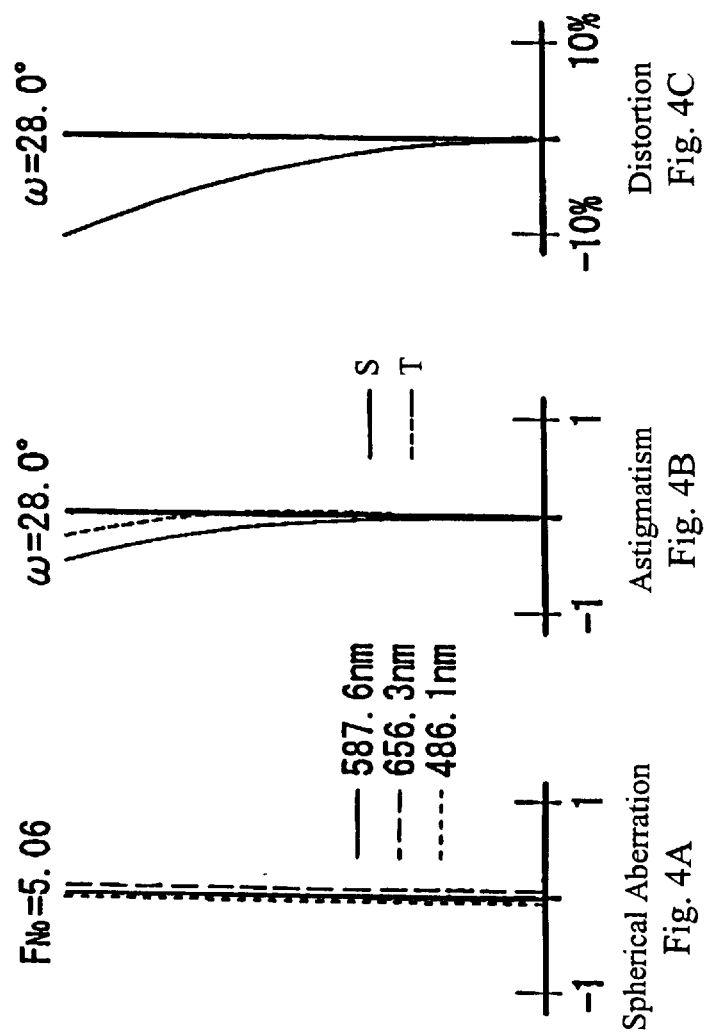

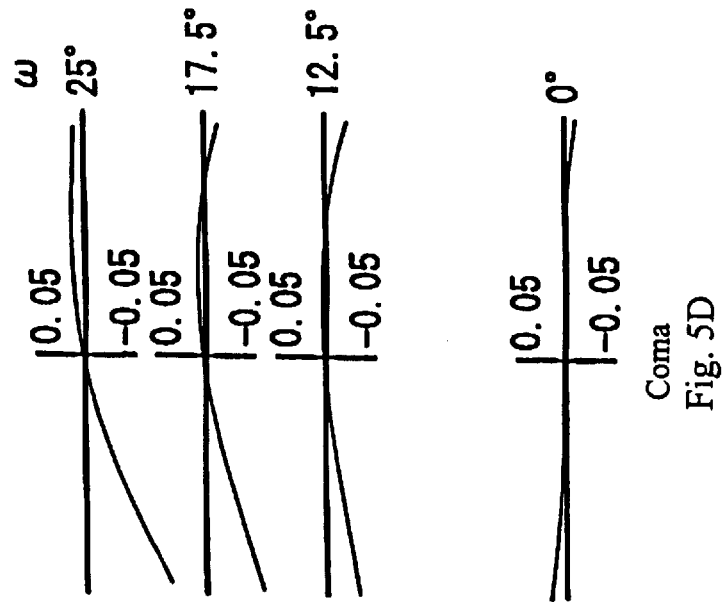
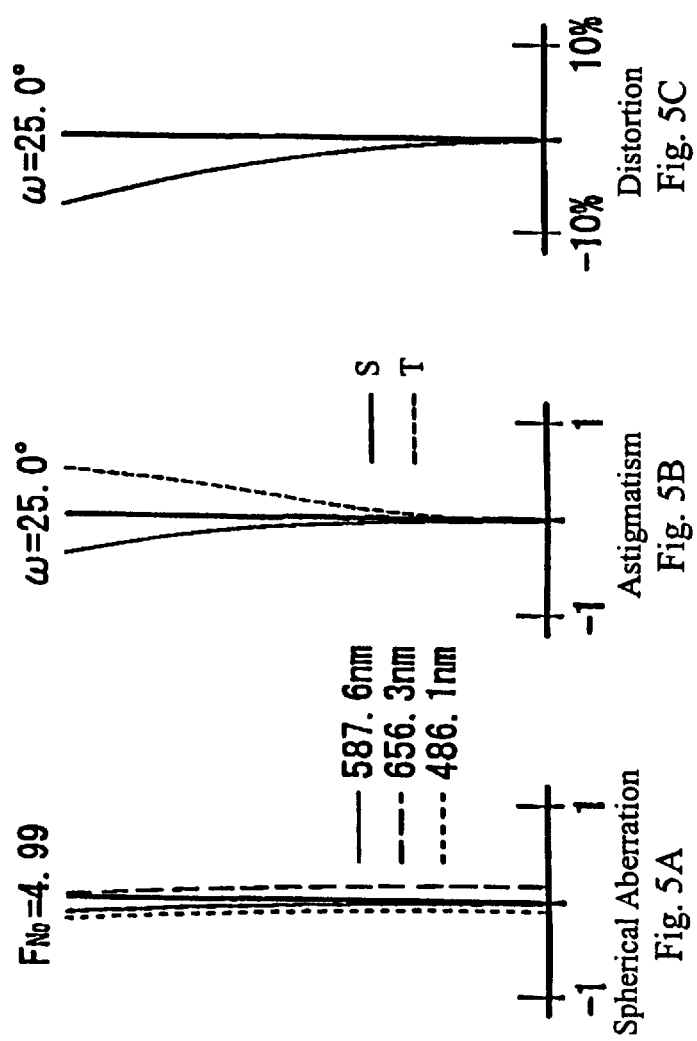
Fig. 5A Spherical Aberration
Fig. 5B Astigmatism
Fig. 5C Distortion
Fig. 5D Coma

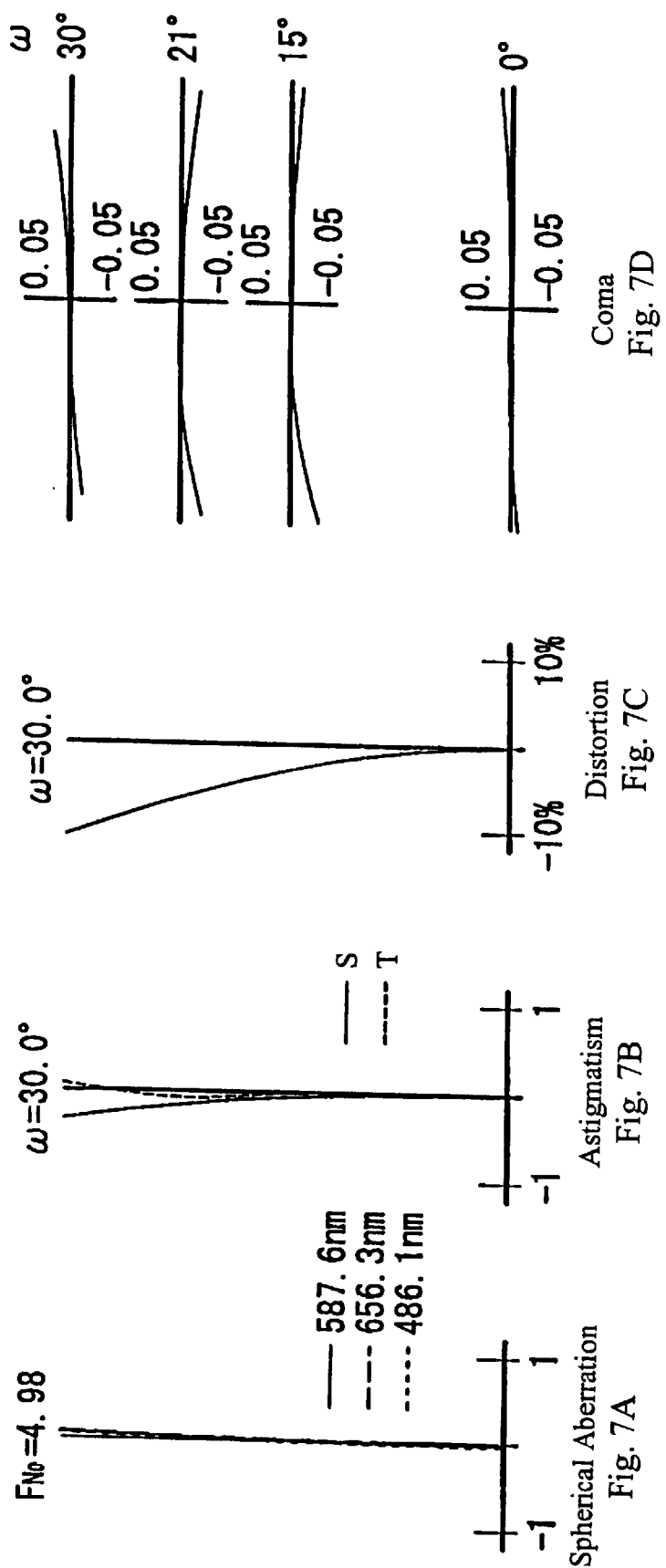

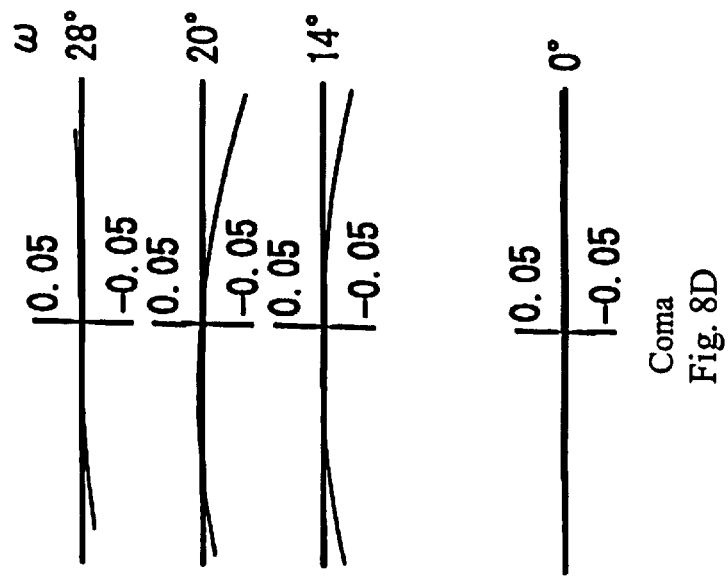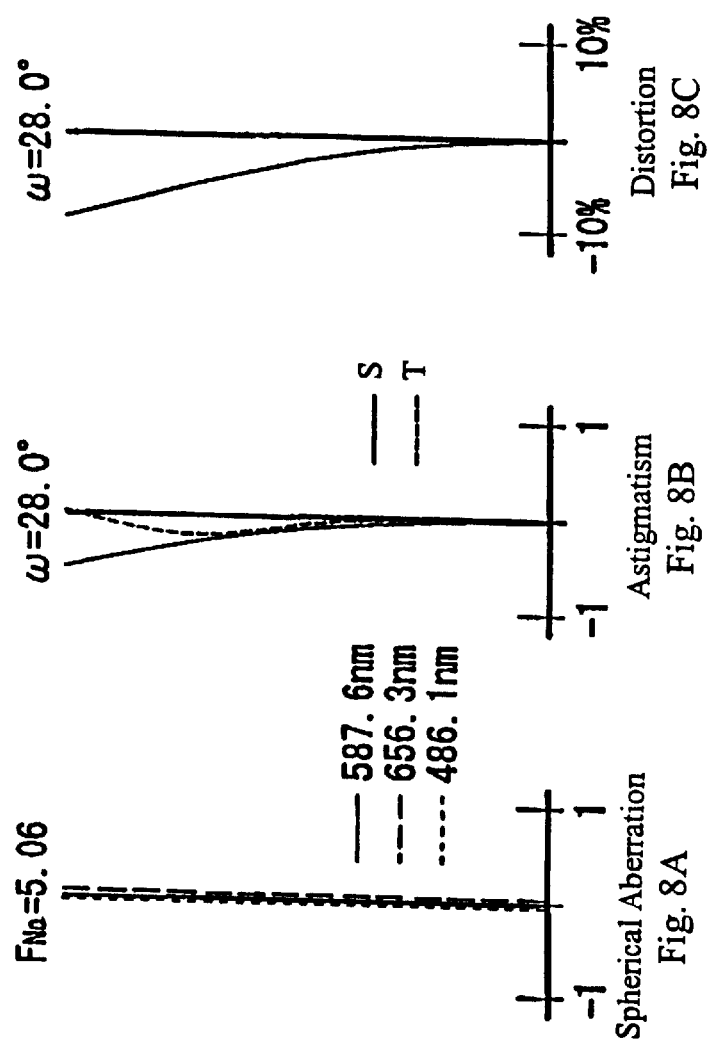

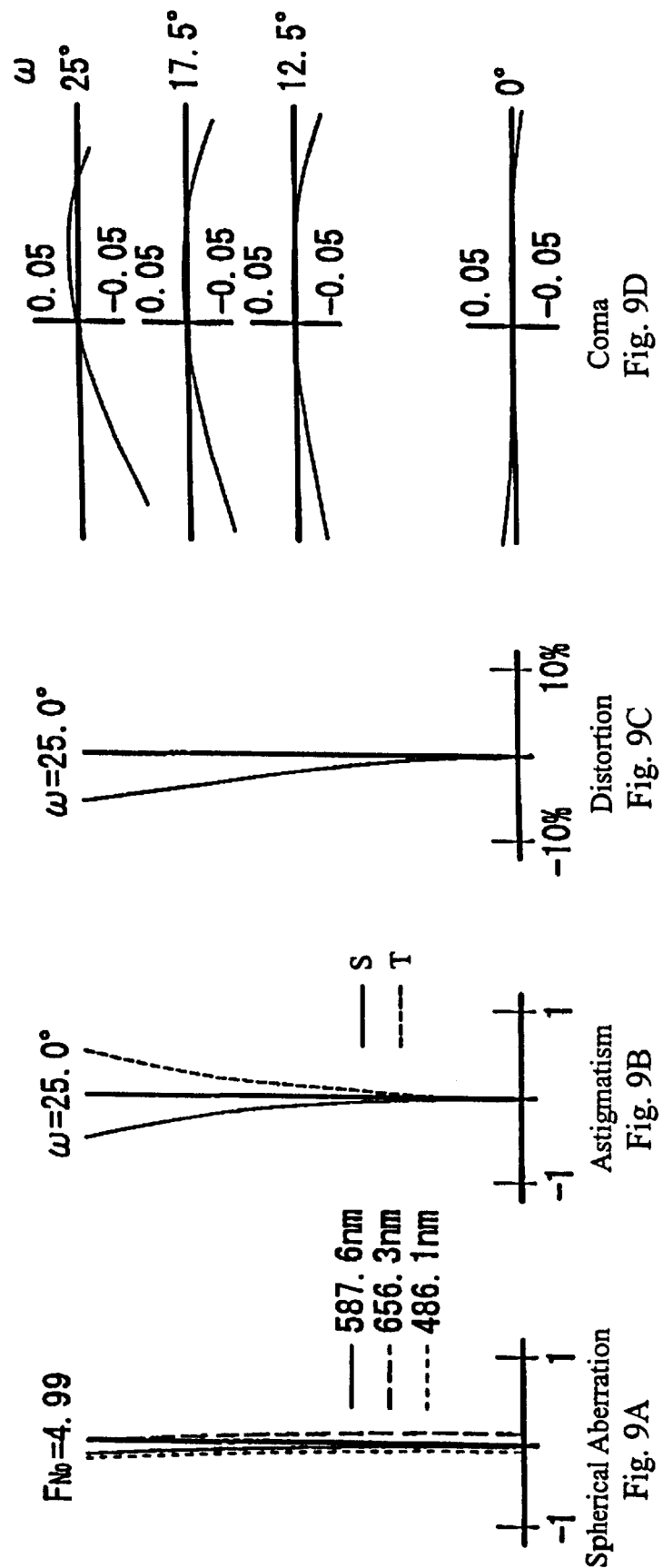

OCULAR ZOOM LENS

BACKGROUND OF THE INVENTION

Conventional ocular zoom lenses are described, for example, in Japanese Patent No. H7-34061 and Japanese Laid Open Patent Application H9-251131. These zoom lenses are composed of, in order from the eye-point side, a first lens group of positive refractive power that is formed of a cemented lens, a second lens group of positive refractive power that is formed of a single lens element, and a third lens group of negative refractive power that is formed of a cemented lens. The second and third lens groups are moved along the optical axis in opposite directions for zooming.

The above-described zoom lenses ensure a relatively large eye relief (i.e., the distance from the lens surface that is the nearest the eye point to the eye point) and provide relatively satisfactory correction of aberrations. However, the image angle at low magnifications is approximately 40°, which is too small.

BRIEF SUMMARY OF THE INVENTION

The present invention relates to an ocular zoom lens that may be used, for example, with a telescope as well as with binoculars. The object of the present invention is to provide an ocular zoom lens that ensures sufficient eye relief using a relatively small number of lens elements while satisfactorily correcting aberrations, even for wide image angles.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion, and coma, respectively, of the ocular zoom lens of Embodiment 1, in the smallest focal length state listed in Table 2;

FIGS. 4A–4D show the spherical aberration, astigmatism, distortion, and coma, respectively, of the ocular zoom lens of Embodiment 1, in the middle focal length state listed in Table 2;

FIGS. 5A–5D show the spherical aberration, astigmatism, distortion, and coma, respectively, of the ocular zoom lens of Embodiment 1, in the largest focal length state listed in Table 2;

FIGS. 7A–7D show the spherical aberration, astigmatism, distortion, and coma, respectively, of the ocular zoom lens of Embodiment 2, in the smallest focal length state listed in Table 4;

FIGS. 8A–8D show the spherical aberration, astigmatism, distortion, and coma, respectively, of the ocular zoom lens of Embodiment 2, in the middle focal length state listed in Table 4; and FIGS. 9A–9D show the spherical aberration, astigmatism, distortion, and coma, respectively, of the ocular zoom lens of Embodiment 2, in the largest focal length state listed in Table 4.

DETAILED DESCRIPTION

Figure 1:
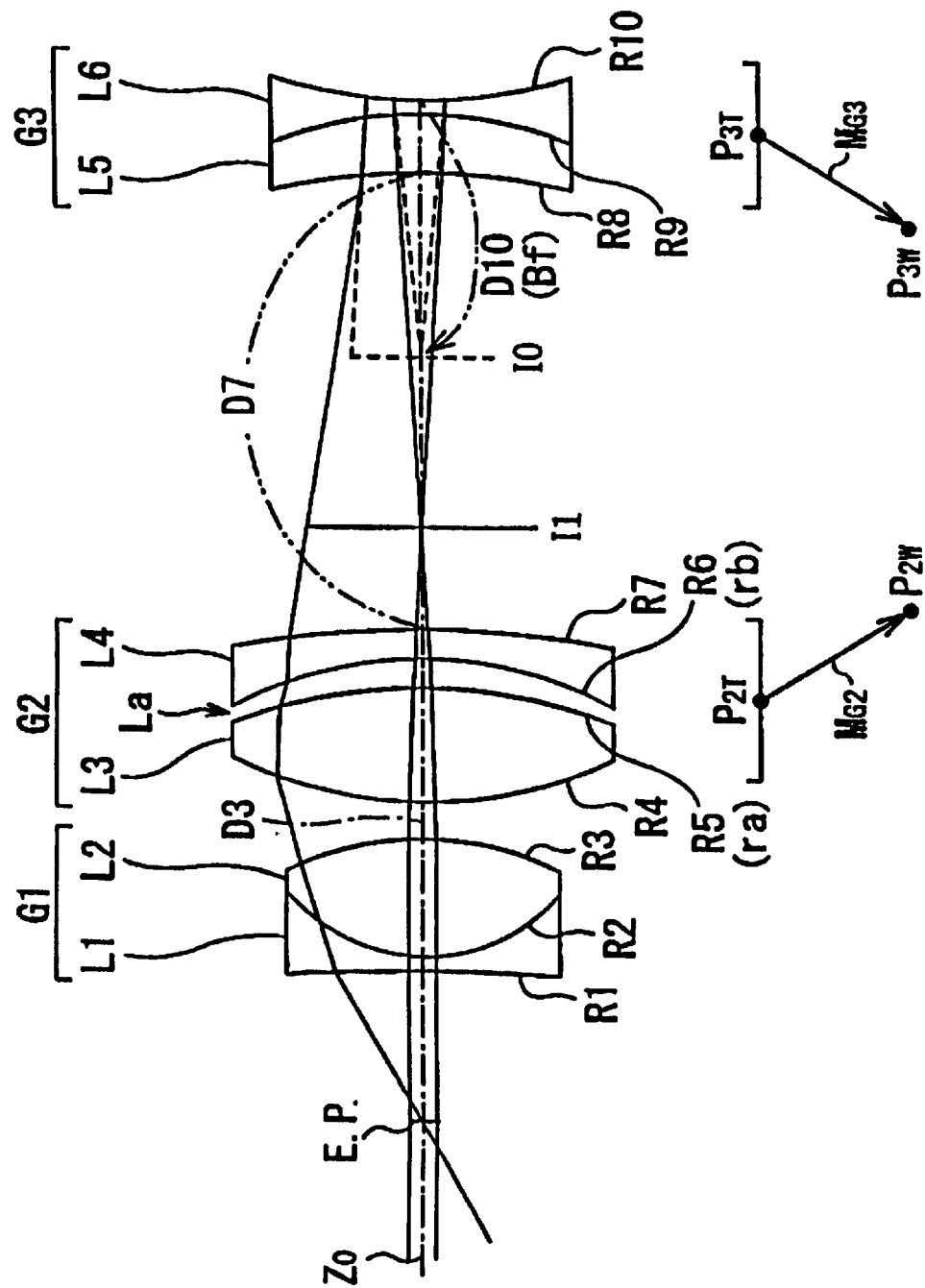
FIG. 1 shows the basic lens element configuration, in sectional view, of the ocular zoom lens according to Embodiment 1 of the present invention.

Referring to FIG. 1, which illustrates Embodiment 1 in particular but is also useful in discussing the invention in general, the ocular zoom lens according to the present invention is composed of, in order from the eye-point side, three lens groups of positive, positive, and negative refractive power, respectively. The first lens group G1 is formed of, in order from the eye-point side, a negative lens L1 that is cemented to a biconvex lens L2. The second lens group G2 is formed of, in order from the eye-point side, a biconvex lens L3 and a negative meniscus lens L4 with its concave surface on the eye-point side, with the biconvex lens and the negative meniscus lens having different radii of curvature for their facing surfaces and being separated along the optical axis by air. The third lens group G3 is formed of a cemented lens of overall negative refractive power. In Embodiment 1, this lens is formed of, in order from the eye-point side, a positive meniscus lens L5 that is cemented to a biconcave lens L6. However, as described below for Embodiment 2 and illustrated in FIG. 6, this lens may instead be formed of, in order from the eye-point side, a biconcave lens L5 that is cemented to a positive meniscus lens L6.

Figure 6:
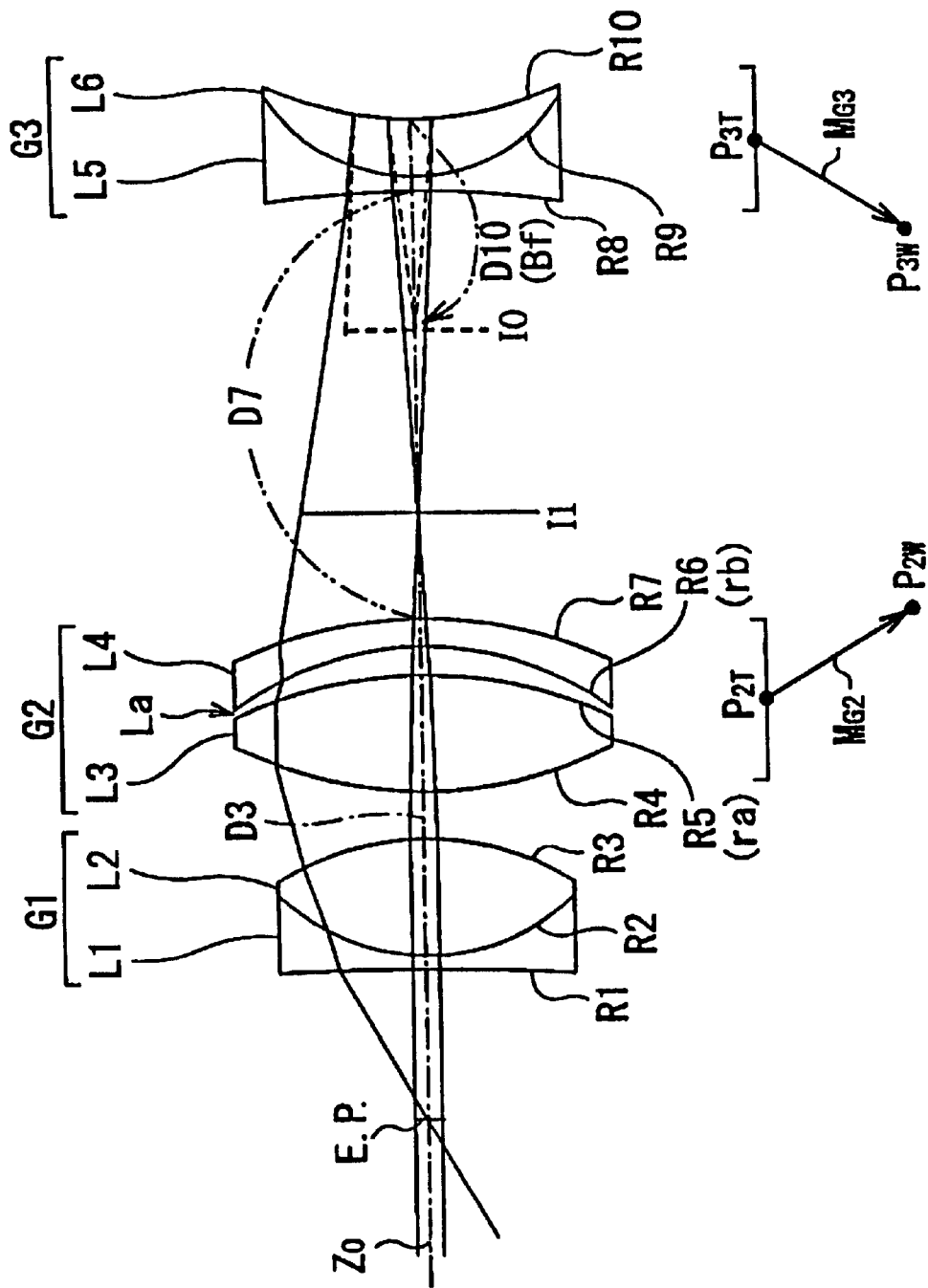
FIG. 6 shows the basic lens element configuration, in sectional view, of the ocular zoom lens according to Embodiment 2 of the present invention.

The second and third lens groups are moved along the optical axis in opposite directions during zooming. In FIGS. 1 and 6, the arrows $M_{G2}$ and $M_{G3}$ show the movements of the second and third lens groups G2 and G3, respectively, during zooming. The points $P_{2T}$ and $P_{3T}$ are representative points for the second and third lens groups G2 and G3, respectively, on the optical axis $Z_0$ in the smallest focal length state. The points $P_{2W}$ and $P_{3W}$ are representative points for the second and third lens groups G2 and G3, respectively, on the optical axis $Z_0$ in the largest focal length state. As is shown in FIG. 1, the second and third lens groups G2 and G3, respectively, approach each other when zooming from the smallest focal length state (high magnification in conjunction with the objective lens system) to the largest focal length state (low magnification in conjunction with the objective lens system).

In the ocular zoom lens according to a first embodiment of the invention, illustrated in FIG. 1, the third lens group G3 is formed of, in order from the eye-point side, a positive meniscus lens L5 that is cemented to a biconcave lens L6. In the ocular zoom lens according to a second embodiment of the invention, illustrated in FIG. 6, the cemented lens of the third lens group G3 is formed of, in order from the eye-point side, a biconcave lens L5 that is cemented to a positive meniscus lens L6.

Figure 2:
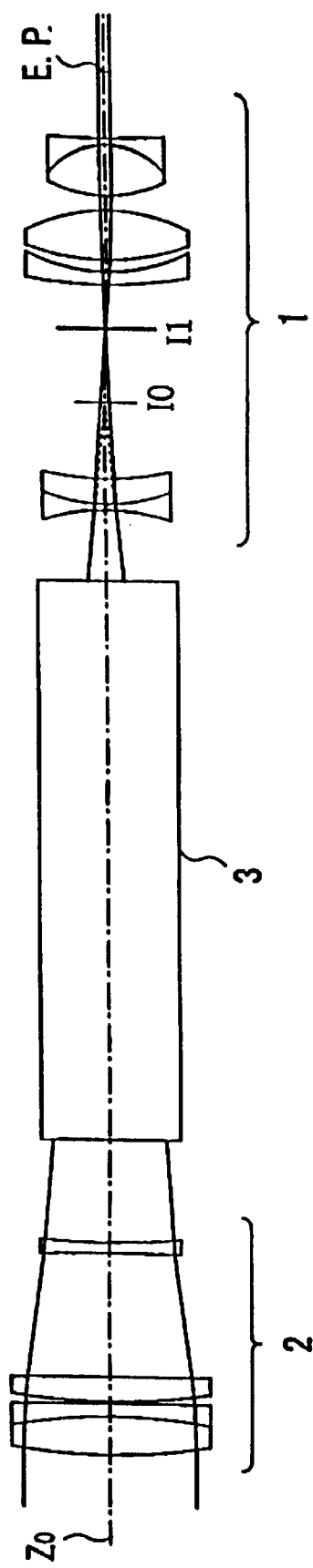
FIG. 2 is a sectional view showing the construction of a zoom telescope optical system which includes the ocular zoom lens of Embodiment 1.

FIG. 2 shows the basic optical component configuration of a zoom telescope optical system which includes the ocular zoom lens 1 of an embodiment of the present invention. In FIG. 2, the eye point E.P. is illustrated on the right side of the figure. In both FIG. 1 (Embodiment 1) and FIG. 6 (Embodiment 2), the eye point has been drawn on the left side of the figure. Thus, the orientation of the ocular zoom lens in FIG. 2 is reversed from left to right from that illustrated in FIGS. 1 and 6. The zoom telescope optical system may be used, for example, with a telescope or with binoculars. The zoom telescope optical system comprises an ocular zoom lens 1, an objective lens 2, and an erecting prism 3 positioned along the optical axis $Z_0$. The objective lens 2 is nearest an object to be observed and forms an image of the object on the side on which the ocular zoom lens 1 is positioned. The ocular zoom lens 1 is used to observe the image formed by the objective lens. The ocular zoom lens 1 has a variable focal length for zooming. The erecting prism 3 serves to invert the image formed by the objective lens 2 and is positioned between the objective lens 2 and the ocular zoom lens 1. In the figure, an image formed by the objective lens system (i.e., the objective lens 2 and the erecting prism 3) on its own is labeled I0 and an image formed by the combination of the objective lens system and the ocular zoom lens 1 is labeled I1. The observer's pupil during viewing is located at the eye point. In both FIG. 1 and FIG. 6, when the illustrated ocular zoom lens is combined with an erecting prism and an objective lens, the erecting prism and objective lens will be positioned along the optical axis $Z_0$ to the right of the components illustrated in FIGS. 1 and 6.

The ocular zoom lens according to the present invention is preferably constructed so that the following Conditions (1)–(4) are satisfied:

$4.0 \leq (ra+rb)/(ra-rb) \leq 10.0$     Condition (1)

$2.5 < f_1/f_M < 4.5$     Condition (2)

$2.0 < f_2/f_M < 3.5$     Condition (3)

$-6.5 < f_3/f_M < -3.0$     Condition (4)

where ra is the radius of curvature of the object-side surface of the biconvex lens in the second lens group, rb is the radius of curvature of the eye-point-side surface of the negative meniscus lens in the second lens group, $f_M$ is the focal length of the ocular zoom lens in the smallest focal length state, $f_1$ is the focal length of the first lens group, $f_2$ is the focal length of the second lens group, and $f_3$ is the focal length of the third lens group.

It is also preferred that the following Conditions (5) and (6) are satisfied:

va<40     Condition (5)

vb>50     Condition (6)

where va is the Abbe number of the negative lens element in the first lens group, and vb is the Abbe number of the biconcave lens element in the third lens group.

The ocular zoom lens of the invention is preferably constructed with the above Condition (1) being satisfied in the second lens group G2. The ocular zoom lens is also preferably constructed with the above Conditions (2) to (4) also being satisfied.

As illustrated in FIG. 1, the ocular zoom lens of Embodiment 1, the following construction. The first lens group G1 is formed of a cemented lens formed of lens elements L1 and L2, in order from the eye-point side, so as to have overall positive refractive power. For example, lens element L1 may be of negative refractive power and lens element L2 may be biconvex. The second lens group of overall positive refractive power is formed of, in order from the eye-point side, a biconvex lens L3 and a negative meniscus lens L4. The third lens group G3 of overall negative refractive power is formed of, in order from the eye-point side, a positive meniscus lens element L5 that is cemented to a biconcave lens L6. However, in Embodiment 2 (as illustrated in FIG. 6), another construction for the third lens group G3 uses a biconcave lens L5 that is cemented to a positive meniscus lens element L6.

The ocular zoom lens of the invention is also preferably constructed with the above Conditions (5) and (6) also being satisfied by the first and third lens groups, respectively.

The present invention employs a second lens group G2 formed of two spaced lenses having different radii of curvature on their facing surfaces. This increases the freedom of design and facilitates aberration correction at wide angles compared to using a second lens group G2 consisting of a single lens. By satisfying Condition (1), the second lens group G2 favorably corrects aberrations and ensures an image angle of approximately 50° in the largest focal length state (i.e., the lowest magnification state in conjunction with the objective lens system).

Condition (1) determines the contour of the air lens La (FIG. 1) between the biconvex lens L3 and the negative meniscus lens L4 in the second lens group G2. The ocular zoom lens enables the satisfactory correction of aberrations at wide image angles by giving a proper refractive power to the air lens La. When Condition (1) exceeds the upper limit, the refractive power of the air lens is too small, hampering the satisfactory correction of astigmatism and coma aberration. On the other hand, when the lower limit of Condition (1) is not satisfied, the power of the air lens La becomes excessive, causing a high order of aberration and unbalancing the aberrations.

Conditions (2)–(4) set the focal lengths $f_1$ to $f_3$ of the lens groups G1 to G3, respectively, as compared with the focal length $f_M$ of the ocular zoom lens in the smallest focal length state, so that a proper distribution of power is obtained among the lens groups.

When the upper limit of Condition (2) is exceeded, the first lens group G1 has less power and the second lens group G2 has relatively more power, creating an imbalance in the aberrations. In particular, astigmatism and distortion increase. In addition, due to less refraction occurring toward the optical axis for peripheral light rays, the second lens group G2 must have a larger useful diameter. On the other hand, when the lower limit of Condition (2) is not satisfied, the first lens group G1 has more power, hampering aberration correction of the first lens group G1. In particular, this increases coma and also causes an imbalance of chromatic aberration.

When the upper limit of Condition (3) is exceeded, the second lens group G2 has less power, increasing the amount of movement needed of the second lens group G2 during zooming. This results in increasing the overall length of the ocular zoom lens. On the other hand, when the lower limit of Condition (3) is not satisfied, the second lens group G2 has more power, hampering aberration correction of the first lens group G1. In particular, there is an increase in astigmatism and coma.

When the upper limit of Condition (4) is exceeded, the third lens group G3 has more negative power and the second lens group G2 has relatively more power, creating an imbalance in the aberrations. On the other hand, when the lower limit of Condition (4) is not satisfied, the third lens group G3 has less negative power, increasing the amount of movement needed of the third lens group G3 during zooming. This results in increasing the overall length of the ocular zoom lens. Furthermore, the second lens group G2 has relatively less power, also increasing the amount of movement needed for the second lens group G2 during zooming. Still further, sufficient eye relief (the distance between the lens surface that is the closest to the eye point and the eye point) is not assured.

The ocular zoom lens uses a first lens group G1 formed of a positive cemented lens which satisfies Condition (5) and a third lens group G3 formed of a negative cemented lens which satisfies Condition (6) in order to satisfactorily correct chromatic aberration. Condition (5) ensures that chromatic aberration is satisfactorily corrected without reducing the radius of curvature of the inside surface of the positive cemented lens of the first lens group G1. Condition (6) ensures that the fluctuation of chromatic aberration is not excessive when zooming.

As explained above, having one of the above constructions ensures sufficient eye relief using a relatively small number of lens elements. It can also ensure a wide image angle of approximately 50° in the smallest focal length state. Furthermore, aberrations are satisfactorily corrected at wide image angles while ensuring sufficient eye relief.

Two embodiments of the invention will now be discussed in greater detail.

EMBODIMENT 1

The lens element configuration of the ocular zoom lens of this embodiment is as shown in FIG. 1. Tables 1 and 2 below give the construction data for this Embodiment. Table 1 lists, in order from the eye-point position, the Group Number G, the surface number #, the radius of curvature R (in mm), and the on-axis surface spacing D (in mm) of each surface as well as the index of refraction $N_d$ and the Abbe number $v_d$ (both measured at the d line, i.e., $\lambda$ equals 587.6 nm) of each optical element. The values of $v_d$ which correspond to va of Condition (5) and vb of Condition (6) are indicated in the last column of Table 1.

TABLE 1

| G | # | R | D | $N_d$ | $v_d$ |
|---|---|---|---|---|---|
| 1 | 1 | −178.80 | 1.07 | 1.80518 | 25.46 (va) |
| 1 | 2 | 12.97 | 8.60 | 1.77250 | 49.62 |
| 1 | 3 | −22.39 | D3 (variable) | 1.00000 | |
| 2 | 4 | 30.72 | 8.60 | 1.80420 | 46.50 |
| 2 | 5 | −38.44 (ra) | 2.15 | 1.00000 | |
| 2 | 6 | −29.07 (rb) | 2.15 | 1.51680 | 64.20 |

TABLE 1-continued

| G | # | R | D | $N_d$ | $v_d$ |
|---|---|---|---|---|---|
| 2 | 7 | −76.78 | D7 (variable) | 1.00000 | |
| 3 | 8 | −47.80 | 4.30 | 1.74077 | 27.76 |
| 3 | 9 | −28.92 | 1.07 | 1.51680 | 64.20 (vb) |
| 3 | 10 | 35.80 | D10 (= −Bf) | | |

Table 2 lists the values of D3 and D7 (i.e., the group spacings, in mm) as well as the values of D10 (which equals minus the back focus Bf—defined as the distance from the image to the last lens element surface) for three different zoom positions, namely, the smallest focal length position, the middle focal length position, and the largest focal length position. In addition, for each of these positions, the focal length f (in mm) and image angle 2ω are listed.

TABLE 2

| | | D3 | D7 | D10 (= −Bf) |
|---|---|---|---|---|
| smallest focal length | (f = 10.01, 2ω = 60°): | 2.69 | 33.79 | 18.85 |
| mid-position | (f = 14.21, 2ω = 56°): | 11.64 | 19.07 | 13.08 |
| largest focal length | (f = 20.01, 2ω = 50°): | 17.01 | 5.00 | 4.39 |

As is apparent from Table 2, the second and third lens groups G2 and G3 are moved along the optical axis $Z_0$ in opposite directions when zooming from one end to the other. In this Embodiment, Condition (1) is satisfied, with the ratio (ra+rb)/(ra−rb) having a value of 7.20. Further, since $f_1/f_M$ equals 3.48, $f_2/f_M$ equals 2.81, and $f_3/f_M$ equals −4.41, Conditions (2)–(4) are satisfied. Furthermore, va equals 25.46 and vb equals 64.20, satisfying Conditions (5) and (6).

FIGS. 3A–3D show the spherical aberration (in mm), astigmatism (in mm), distortion and coma (in mm), respectively, of the ocular zoom lens of Embodiment 1 at the smallest focal length. FIGS. 4A–4D show these same aberrations, respectively, of the ocular zoom lens of Embodiment 1 at the mid-position. FIGS. 5A–5D show these same aberrations, respectively, of the ocular zoom lens of Embodiment 1 at the largest focal length. These aberrations are illustrated for a reference wavelength of 587.6 nm (d line), except the spherical aberration is also illustrated for reference wavelengths of 486.1 nm (F line) and 656.3 nm (C line). In FIGS. 3B, 4B, and 5B the astigmatism is illustrated for both the sagittal image plane S and the tangential image plane T. The f-number $F_{NO}$ is indicated in FIGS. 3A, 4A and 5A, and the half-image angle ω is indicated in FIGS. 3B–3D, 4B–4D, and 5B–5D.

EMBODIMENT 2

The lens element configuration of the ocular zoom lens 1 of this embodiment is as shown in FIG. 6. This Embodiment differs from that of Embodiment 1 in that, whereas the lens L5 is a positive meniscus and the lens element L6 is biconcave in Embodiment 1, in this Embodiment the lens element L5 is biconcave and the lens L6 has a positive meniscus shape.

Tables 3 and 4 below give the construction data for this embodiment. Table 3 lists, in order from the eye-point position, the Group Number G, the surface number #, the radius of curvature R (in mm), and the on-axis surface spacing D (in mm) of each surface as well as the index of refraction $N_d$ and the Abbe number $v_d$ (both at the d line-i.e., λ equals 587.6 nm) of each optical element. The values of $v_d$ which correspond to $v_a$ of Condition (5) and $v_b$ of Condition (6) are also indicated in the last column of Table 3.

TABLE 3

| G | # | R | D | $N_d$ | $v_d$ |
|---|---|---|---|---|---|
| 1 | 1 | −282.13 | 1.07 | 1.78471 | 25.72 (va) |
| 1 | 2 | 15.76 | 8.60 | 1.72000 | 50.34 |
| 1 | 3 | −21.16 | D3 (variable) | 1.00000 | |
| 2 | 4 | 31.07 | 8.60 | 1.72000 | 50.34 |
| 2 | 5 | −32.54 (ra) | 2.15 | 1.00000 | |
| 2 | 6 | −23.22 (rb) | 2.15 | 1.71736 | 29.50 |
| 2 | 7 | −32.18 | D7 (variable) | 1.00000 | |
| 3 | 8 | −78.89 | 1.07 | 1.62041 | 60.34 (vb) |
| 3 | 9 | 13.01 | 4.30 | 1.78471 | 25.72 |
| 3 | 10 | 25.66 | D10 (= −Bf) | | |

Table 4 lists the values of D3 and D7 (i.e., the group spacings, in mm) as well as the values of D10 (which equals minus the back focus Bf—defined as the distance from the image to the last lens element surface) for three different zoom positions, namely, the smallest focal length position, the middle focal length position and the largest focal length position. In addition, for each of these positions, the focal length f (in mm) and image angle 2ω are listed.

TABLE 4

| | | D3 | D7 | D10 (= −Bf) |
|---|---|---|---|---|
| smallest focal length | (f = 10.00, 2ω = 60°): | 3.52 | 31.85 | 15.72 |
| mid-position | (f = 14.20, 2ω = 56°): | 12.43 | 18.18 | 10.96 |
| largest focal length | (f = 20.00, 2ω = 50°): | 18.54 | 5.47 | 4.35 |

As is apparent from Table 4, the second and third lens groups G2 and G3 are moved along the optical axis $Z_0$ in opposite directions when zooming from one end to the other. In this Embodiment, Condition (1) is satisfied, with the ratio (ra+rb)/(ra−rb) having a value of 5.98. Further, since $f_1/f_M$ equals 3.53, $f_2/f_M$ equals 2.82, and $f_3/f_M$ equals −3.91, Conditions (2)–(4) are satisfied. Furthermore, va equals 25.72 and vb equals 60.34, satisfying Conditions (5) and (6).

FIGS. 7A–7D show the spherical aberration (in mm), astigmatism (in mm), distortion and coma (in mm), respectively, of the ocular zoom lens of Embodiment 2 at the smallest focal length. FIGS. 8A–8D show these same aberrations, respectively, of the ocular zoom lens of Embodiment 2 at the mid-position. FIGS. 9A–9D show these same aberrations, respectively, of the ocular zoom lens of Embodiment 2 at the largest focal length. These aberrations are illustrated for a reference wavelength of 587.6 nm (d line), except the spherical aberration is also illustrated for reference wavelengths of 486.1 nm (F line) and 656.3 nm (C line). In FIGS. 7B, 8B, and 9B the astigmatism is illustrated for both the sagittal image plane S and the tangential image plane T. The f-number $F_{NO}$ is indicated in FIGS. 7A, 8A and 9A, and the half-image angle ω is indicated in FIGS. 7B–7D, 8B–8D, and 9B–9D.

As explained above, the ocular zoom lens of the above two embodiments satisfies each of the Conditions (1)–(4) and favorably corrects the various aberrations while providing a sufficient eye relief and a wide image angle 2ω of 50° even at the largest focal length position of the zoom range.

The invention being thus described, it will be obvious that the same may be varied in many ways. For example, the radii of curvature R and surface spacings D may be readily scaled from the specific embodiments disclosed to achieve an ocular zoom lens of different zoom range. In addition, different optical materials may be selected. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An ocular zoom lens comprising, in sequential order from the eye-point side:

a first lens group having positive refractive power;

a second lens group having positive refractive power; and a third lens group having negative refractive power;

wherein the second and third lens groups are moved along the optical axis in opposite directions for zooming; and the second lens group is formed of, in sequential order from the eye-point side, a biconvex lens and a negative meniscus lens with its concave surface on the eye-point side, the surfaces of the biconvex lens and the negative meniscus lens that face one another having different radii of curvature and being positioned on-axis with an intervening air space.

2. The ocular zoom lens according to claim 1, wherein the following condition is satisfied:

$$4.0 \leq (ra+rb)/(ra-rb) \leq 10.0$$

where ra is the radius of curvature of the object-side surface of the biconvex lens in the second lens group; and rb is the radius of curvature of the eye-point-side surface of the negative meniscus lens in the second lens group.

3. The ocular zoom lens according to claim 1, wherein the following conditions are satisfied:

$$2.5 < f_1/f_M < 4.5$$

$$2.0 < f_2/f_M < 3.5$$

$$-6.5 < f_3/f_M < -3.0$$

where $f_1$ is the focal length of the first lens group, $f_2$ is the focal length of the second lens group, $f_3$ is the focal length of the third lens group, and $f_M$ is the focal length of the ocular zoom lens in the smallest focal length state.

4. The ocular zoom lens according to claim 2, wherein the following conditions are satisfied:

$$2.5 < f_1/f_M < 4.5$$

$$2.0 < f_2/f_M < 3.5$$

$$-6.5 < f_3/f_M < -3.0$$

where f$_1$ is the focal length of the first lens group, f$_2$ is the focal length of the second lens group, f$_3$ is the focal length of the third lens group, and f$_M$ is the focal length of the ocular zoom lens in the smallest focal length state.

5. The ocular zoom lens according to claim 1, wherein the first lens group is formed of, in order from the eye-point side, a negative lens element that is cemented to a biconvex lens;

the third lens group is formed of, in order from the eye-point side, either (a) a lens of positive meniscus shape that is cemented to a biconcave lens element or (b) a biconcave lens element that is cemented to a lens of positive meniscus shape, and the following conditions are satisfied:

νa<40

νb>5 where

νa is the Abbe number of the negative lens element in the first lens group; and

νb is the Abbe number of the biconcave lens element in the third lens group.

6. The ocular zoom lens according to claim 2, wherein:

the first lens group is formed of, in order from the eye-point side, a negative lens element that is cemented to a biconvex lens;

the third lens group is formed of, in order from the eye-point side, either (a) a lens of positive meniscus shape that is cemented to a biconcave lens element or (b) a biconcave lens element that is cemented to a lens of positive meniscus shape, and the following conditions are satisfied:

νa<40

νb>50 where

νa is the Abbe number of the negative lens element in the first lens group; and

νb is the Abbe number of the biconcave lens element in the third lens group.

7. The ocular zoom lens according to claim 3, wherein the first lens group is formed of, in order from the eye-point side, a negative lens element that is cemented to a biconvex lens;

the third lens group is formed of, in order from the eye-point side, either (a) a lens of positive meniscus shape that is cemented to a biconcave lens element, or (b) a biconcave lens element that is cemented to a lens of positive meniscus shape, and the following conditions are satisfied:

νa<40

νb>50 where

νa is the Abbe number of the negative lens element in the first lens group; and

νb is the Abbe number of the biconcave lens element in the third lens group.

8. The ocular zoom lens according to claim 4, wherein the first lens group is formed of, in order from the eye-point side, a negative lens element that is cemented to a biconvex lens;

the third lens group is formed of, in order from the eye-point side, either (a) a lens of positive meniscus shape that is cemented to a biconcave lens element, or (b) a biconcave lens element that is cemented to a lens of positive meniscus shape, and the following conditions are satisfied:

νa<40

νb>50 where

νa is the Abbe number of the negative lens element in the first lens group; and

νb is the Abbe number of the biconcave lens element in the third lens group.

9. The ocular zoom lens according to claim 1, wherein the following condition is satisfied:

$2.5 < f_1/f_M < 4.5$ where f$_1$ is the focal length of the first lens group, and f$_M$ is the focal length of the ocular zoom lens in the smallest focal length state.

10. The ocular zoom lens according to claim 1, wherein the following condition is satisfied:

$2.0 < f_2/f_M < 3.5$ where f$_2$ is the focal length of the second lens group, and f$_M$ is the focal length of the ocular zoom lens in the smallest focal length state.

11. The ocular zoom lens according to claim 1, wherein the following condition is satisfied:

$-6.5 < f_3/f_M < -3.0$ where f$_3$ is the focal length of the third lens group, and f$_M$ is the focal length of the ocular zoom lens in the smallest focal length state.

* * * * *

UNITED STATES PATENT AND TRADEMARK OFFICE
CERTIFICATE OF CORRECTION

PATENT NO. : 6,606,203 B2
DATED : August 12, 2003
INVENTOR(S) : Nagatoshi

It is certified that error appears in the above-identified patent and that said Letters Patent is hereby corrected as shown below:

Column 3,
Line 38, change the line to -- $2.0 < f_2 / f_M < 3.5$        . . . Condition (3) --;

Column 4,
Line 2, change "1, the" to -- 1 has the --;

Column 6,
Line 51, change "$F_{NO}$" to -- $F_{NO}$ --;

Column 7,
Line 42, change "In this Embodiment" to -- In this embodiment --;

Column 8,
Line 11, change "Rather the" to -- Rather, the --;
Line 49, change the line to -- $2.0 < f_2 / f_M < 3.5$        . . . Condition (3) --;

Column 9,
Lines 12, 35 and 57, change "biconvex lens;" to -- biconvex lens; and --; and Column 10,
Line 16, change "biconvex lens;" to -- biconvex lens; and --.

Signed and Sealed this

Twenty-eighth Day of October, 2003

JAMES E. ROGAN
*Director of the United States Patent and Trademark Office*